(12) United States Patent
Miranker et al.

(10) Patent No.: US 10,216,860 B2
(45) Date of Patent: *Feb. 26, 2019

(54) SYSTEM FOR ACCESSING A RELATIONAL DATABASE USING SEMANTIC QUERIES

(71) Applicants: Daniel Paul Miranker, Austin, TX (US); Juan Federico Sequeda, Austin, TX (US)

(72) Inventors: Daniel Paul Miranker, Austin, TX (US); Juan Federico Sequeda, Austin, TX (US)

(73) Assignee: Capsenta, Inc., Austin, TX (US)

( * ) Notice: Subject to any disclaimer, the term of this patent is extended or adjusted under 35 U.S.C. 154(b) by 262 days.

This patent is subject to a terminal disclaimer.

(21) Appl. No.: 15/165,775

(22) Filed: May 26, 2016

(65) Prior Publication Data

US 2016/0275204 A1 Sep. 22, 2016

Related U.S. Application Data

(63) Continuation of application No. 14/220,526, filed on Mar. 20, 2014, now Pat. No. 9,396,283, which is a continuation of application No. 13/278,907, filed on Oct. 21, 2011, now Pat. No. 8,719,252.

(60) Provisional application No. 61/406,021, filed on Oct. 22, 2010.

(51) Int. Cl.
*G06F 17/30* (2006.01)
(52) U.S. Cl.
CPC .. *G06F 17/30976* (2013.01); *G06F 17/30557* (2013.01); *G06F 17/30707* (2013.01); *G06F 17/30911* (2013.01); *G06F 17/30917* (2013.01); *G06F 17/30932* (2013.01); *G06F 17/30935* (2013.01)

(58) Field of Classification Search
CPC ........ G06F 17/30917; G06F 17/30557; G06F 17/30932
See application file for complete search history.

(56) References Cited

U.S. PATENT DOCUMENTS

| | | |
|---|---|---|
| 8,037,108 B1 | 10/2011 | Chang |
| 2006/0235837 A1 | 10/2006 | Chong et al. |
| 2008/0256026 A1 | 10/2008 | Hays |
| 2009/0132503 A1 | 5/2009 | Sun et al. |
| 2009/0138437 A1 | 5/2009 | Krishnamoorthy et al. |
| 2010/0114885 A1 | 5/2010 | Bowers et al. |
| 2010/0241644 A1* | 9/2010 | Jackson ............ G06F 17/30392 707/760 |
| 2010/0250576 A1 | 9/2010 | Bowers et al. |
| 2011/0202560 A1* | 8/2011 | Bowers ............. G06F 17/30401 707/773 |

OTHER PUBLICATIONS

Awinecki, Maciej, How schema mapping can help in data integration?—integrating the relational databases with ontologies, [online], ICT School, Computer Science, XXIII cycle DII, University of Modena and Reggio Emilia 2008.

* cited by examiner

*Primary Examiner* — Alexander Khong
(74) *Attorney, Agent, or Firm* — Sabety + associates, PLLC; Ted Sabety

(57) ABSTRACT

This invention is a system for integrating relational databases into a semantic web framework utilizing a simple mapping process and the SQL query optimizer present in the SQL database engine.

48 Claims, 18 Drawing Sheets

Input: S: SQL-DDL of the relational schema
Ouput: TripleView: a SQL CREATE VIEW that generates the TripleView (1) Transform SQL-DDL to Putative Ontology PO ← SQL-DDL
(2) Initialize list of all select statements S ← { }
(3) for each ontological object o of PO
(4)   if(o is a Class)
(5)     S ← SELECT 'o.name+o.pk' as s, o.pk as spk, 'rdf:type' as p, o.name as o, null as opk FROM o.name
(6)   else if(o is a Datatype Property)
(7)     S ← SELECT 'o.domain+o.pk' as s, o.pk as spk, 'x.name' as p, x.name as o, null as opk FROM x.domain
(8)   else if(o is a Object Property)
(9)     if (o is a Binary Relation)
(10)      S ← SELECT 'x.domain+x.domain.pk' as s, x.domain.pk as spk, 'x.name' as p, 'x.range+x.range.pk' as o,
              x.range.pk as opk FROM x.name
(11)    else if(o is a foreign key)
(12)      S ← SELECT 'x.domain+x.domain.pk' as s, x.domain.pk as spk, 'x.name' as p, 'x.range+x.range.pk' as o,
              x.range.pk as opk FROM x.domain
(13)   end if
(14) end if
(15) end for each
(16) TripleView ← 'CREATE VIEW TripleView(s, spk, p, o, opk) AS'
(17) for each select statement s of S
(18)   TripleView ← s + 'UNION ALL'
(19) end for each

Figure 6

RDF Triples

| S | SPK | P | O | OPK |
|---|---|---|---|---|
| Course3 | 3 | rdf:type | Course | null |
| Course3 | 3 | course_title | CS101 | null |
| Course3 | 3 | course_dept | Dept5 | 5 |
| Dept5 | 5 | rdf:type | Dept | null |
| Dept5 | 5 | dept_name | CS | null |
| Course4 | 4 | rdf:type | Course | null |
| Course4 | 4 | course_title | EE101 | null |
| Course4 | 4 | course_dept | Dept6 | 6 |
| Dept6 | 4 | rdf:type | Dept | null |
| Dept6 | 4 | dept_name | EE | null |

SQL Schema

Course

| CID | Title | DID |
|---|---|---|
| 4 | EE101 | 6 |

Dept

| DID | Name |
|---|---|
| 6 | EE |

Figure 7

```
SELECT ?title ?name
WHERE {
    ?x course_title ?title .
    ?x course_dept ?y .
    ?y dept_name ?name
}
```

```
SELECT
    t0.o as title, t2.o as name
FROM TripleView t0, TripleView t1,
     TripleView t2
WHERE
    t0.p = 'course_title' AND
    t1.p = 'course_dept' AND
    t2.p = 'dept_name' AND
    t0.sk = t1.sk AND
    t1.ok = t2.sk
```

```
CREATE VIEW tripleView
    ...
    UNION
SELECT "Course"+courseID as s, "Course#title" as p, title as o
FROM Course
WHERE title is not null
    UNION
    ...
```

(b)

```
CREATE VIEW tripleView
    ...
    UNION
SELECT "Course"+courseID as s,
"http://example.com/university/course
" as p, title as o
FROM Course
WHERE title is not null
    UNION
    ...
```

Figure 10a tripleView Without Implelmenting the Creation of URIs

Figure 10b tripleView With Implelmenting the Creation of URIs

Fig 14

$$\sigma_{a_j \text{ is not null and } a_j \text{ is not null}} \rightarrow \Pi_{a_i, a_j} \rightarrow R$$

SYSTEM FOR ACCESSING A RELATIONAL DATABASE USING SEMANTIC QUERIES

This application claims priority as a continuation of U.S. patent application Ser. No. 14/220,526 filed on Mar. 20, 2014, a continuation of U.S. patent application Ser. No. 13/278,907 filed on Oct. 21, 2011, which is a nonprovisional application that claims the benefit of U.S. Provisional Patent Application No. 61/406,021, filed on Oct. 22, 2010, all of which are hereby incorporated by reference for all that they teach.

This invention was supported in part by a grant from the National Science Foundation, Grant No. 1018554 and portions of this invention may be subject to a paid-up license to the U.S. Government.

BACKGROUND

The goals of Semantic Web technology include creating a structurally uniform representation of heterogeneous data, data models, and application domain models in a stack of computer languages, RDF (Resource Description Framework), RDFS (RDF Schema), OWL (Web Ontology Language) and SPARQL (SPARQL Protocol and RDF Query Language), also known as the Semantic Web stack. The Semantic Web as a computing process, architecture and form of organizing data has been described and implemented in various ways by the W3C (World Wide Web Consortium), which is the industry group that maintains Internet protocol and data formatting standards. For more information on the semantic web, see "Semantic Web in Action", Scientific American, December 2007, Feigenbaum et. al., incorporated herein by reference. RDF is a graph representation of data. SPARQL is an SQL-like language for querying RDF data sources. RDFS and OWL provide richer means to encode structure and domain models and logic. The entire system is object-oriented where RDFS and OWL inherit from RDF. The entire stack is well grounded to integrate knowledge-based, and logic-based solutions to data integration, mining and analysis problems.

Relational database management systems support a wide range of applications. Relational databases comprise data stored as records in tables, (synonymously rows in relations). Each table defines a record structure comprising a set of named columns. SQL is a standardized language used to define and query relational databases.

This invention is a system and method for integrating relational databases into a semantic web framework utilizing a simple mapping process and the SQL query optimizer present in the SQL database engine. Functionally this means, a domain model for the relational database is made available in a Semantic Web language and the database contents is made available for retrieval through standard SPARQL query and linked-data end-points.

SUMMARY OF THE INVENTION

The invention is comprised of four primary components. Two components comprise a compile time aspect. These compile time components may be integrated 103 or accomplished separately.

A first component 103 algorithmically transforms the relational databases SQL schema, to an equivalent representation in one or more Semantic Web languages, including, but not limited to RDF (Resource Description Framework), RDFS, OWL or RIF. The transformation is made consistent with the semantic web schema. The result is called the synthesized domain model. In one embodiment, the transformation includes the relational constraints. The synthesized domain model acts as a mapping of the relational schema to the semantic web schema. The mapping can be used to map the semantic web schema back to the relational schema.

In one embodiment the URIs (Uniform Resource Identifier) that identify the elements in the synthesized domain model may be replaced with different URIs. The replacement URIs may come from an existing domain model. The replacement URIs may also be defined so the results are more fitting for the consumption of the output of the system. In one embodiment, URIs are the standard RDF method for representing labels in an ontology. In other embodiments the label representation of any formalized ontology system may be used.

For example, the RDF of the relation data can be represented as a relation with three columns: subject, predicate and object. The SQL schema may identify tables, for example, if the database is storing employee information, a table for "EMPLOYEES", where there is a column denoting "NAME". The RDF representation of the relational data stored in this SQL schema consists of a triple where the subject is the URI that identifies a row of the "EMPLOYEE" table, the predicate is the URI that identifies the "NAME" attribute and the object is the value of "NAME" for the row.

A second component 103 that creates a relational database representation of the relational data as RDF triples that can respond to SQL queries. The precise content of the RDF triples is determined by and is consistent with the synthesized domain model. The content and structure of the RDF triples is determined by one or more queries. The queries may be embedded in a SQL CREATE VIEW command or may be used directly to materialize the RDF triples. Materialize means that the resulting data is produced, rather than relying on a logical rule that has to be executed. It is common for relational database systems to offer configuration options such that a VIEW command is implemented as a logical construct or by materializing and storing the results of the embedded SQL query.

Two additional components comprise a runtime aspect that executes SPARQL queries.

A third component 105 that translates a SPARQL query to an equivalent SQL query that operates on the relational representation of its contents as triples. The arguments of the SQL query include the RDF representations of the relational database data contents. Those values are derived from the mapping from the relational database to the RDF, that is, the synthesized domain model. The system and method does not require materializing the RDF triples. Instead, a logical definition using the CREATE VIEW command can be used to either logically create a triple table or to materialize one. In one embodiment, an incoming SPARQL query is translated into a syntactically equivalent SQL query that can operate on the relational database engine by using the VIEW logically, or can act on the triples materialized from the relational database using the VIEW or replace the VIEW in the FROM clause with the results of the VIEW command in SQL. The VIEW logically defines a three column view (subject, property and object), containing one data value per triple. It is common that the column names of the relational database become property IRI (Internationalized Resource Identifiers) in the synthesized domain model. The translation module will parse the SPARQL query using typical computer cross compiling processing and computer language grammar. Property IRIs in the SPARQL query are translated into SQL as equality tests on the property column of the view. In one embodiment, the primary keys are used explicitly in the synthesized domain model. In another embodiment an unlabeled RDF node, a blank node, is used to represent the association of data, values. The SPARQL query translation to SQL includes database JOINs and OUTER-JOINs on the three column view such that the resulting SQL query can represents the assembly of separate RDF data nodes into values in the same relational database record. The SQL query may include formatting commands such that the final output is a structured SQL representation or any accepted serialized format for SPARQL queries, including XML. In another embodiment, the SQL output is sent to a separate module that re-formats the data to conform with the requirements of the SPARQL query.

A fourth component is the relational database engine itself. The relational database engine contains a SQL query optimizer 111. Typical relational databases contain a SQL query optimizer that will re-organize a SQL query into one or more steps in order to run the actual database table and record searches more quickly. These steps may be re-ordered or manipulated to make the data access process more efficient. For example, a selection condition that is in the query can be broken up into a combination of simpler conditions. Other manipulations using relational algebra may be used to optimize the SQL query. The optimizer is used for rewriting triple based queries and effecting execution of a SQL on the relational representation. As a result of the SQL query, the output of the data is equivalent to the execution of the SPARQL query directly on the RDF representation of the data. The SQL optimizer does all of the rewrites to fetch the data automatically. Therefore, no specialized software is required to perform the translation.

In another embodiment, the runtime aspect may be organized such that the SPARQL to SQL translator 105 does not organize the final output, but rather derives only a SQL query that produces results in a representation common to relational databases 205 and the final formatting is accomplished by another software component 206.

It is understood that what is referred to as "triple" may in other embodiments also be a table, a logical view definition or a materialized view. It is understood what is referred to as a "triple" may be represented with more than 3 columns where in addition to the subject, property and relation columns, index columns or other ancillary information may be included. There may be more than one triple table where a given table would be for a particular datatype. Therefore a "triple" table may refer to a table with more than three columns and there may be more than one triple table used to process a query, so that the query can be applied to more than one datatype.

There are a number of acceptable printable formats for the results of SPARQL queries, including RDF. See "SPARQL Query Language for RDF", W3C Recommendation, January 2008, by Eric Prud'hommeaux and Andy Seaborne which is incorporated herein by reference. RDF itself has a number of acceptable printable formats including RDF/XML see "RDF/XML Syntax Specification (Revised)" by Dave Beckett, "Turtle—Terse RDF Triple Language" by Dave Beckett and Tim Berners-Lee and "Notation 3" by Tim Berners-Lee.

Alternately the runtime aspect may provide data according to Linked Data protocols. Given a URI, it executes a SPARQL query and the RDF result is returned over HTTP. For more information on Linked Data see "Linked Data" by Tim Berners-Lee, incorporated herein by reference

BRIEF DESCRIPTION OF THE DRAWINGS

FIG. 6: Algorithm to create a relational triple representation given the SQL-DDL of the relational schema FIG. 7: Example relational schema with instances and the relational triple representation with the same instances FIG. 8: Example SPARQL query and a semantically equivalent SQL query on the relational triple representation

FIG. 10: Example of Tripleview before and after the label substitution

FIG. 14. Logical query plan for BSBM6 after Self-join Elimination optimization.

DETAILED DESCRIPTION OF THE PREFERRED EMBODIMENTS

Figure 1:
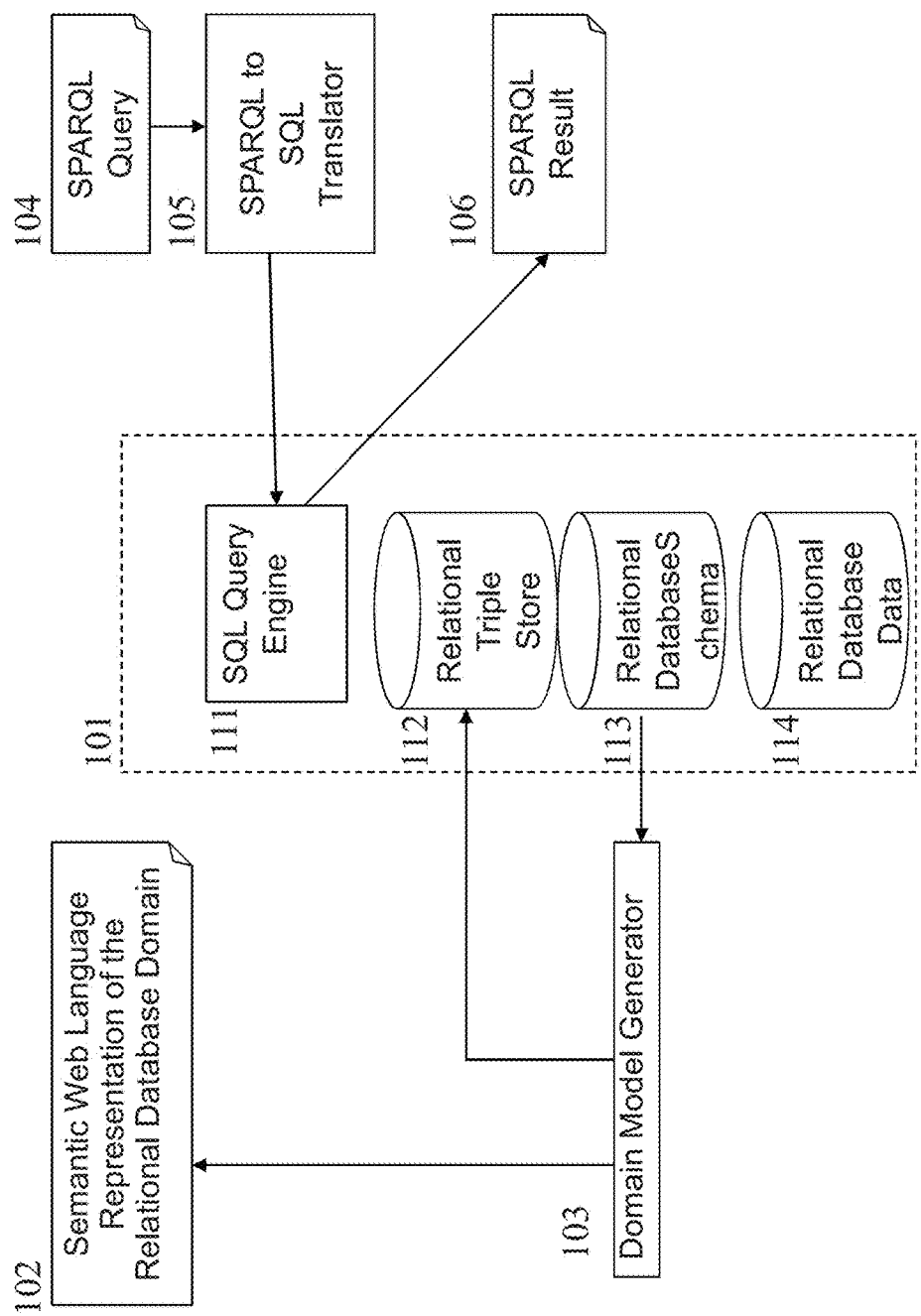
FIG. 1: Diagram of the relation between components of the invention
Figure 2:
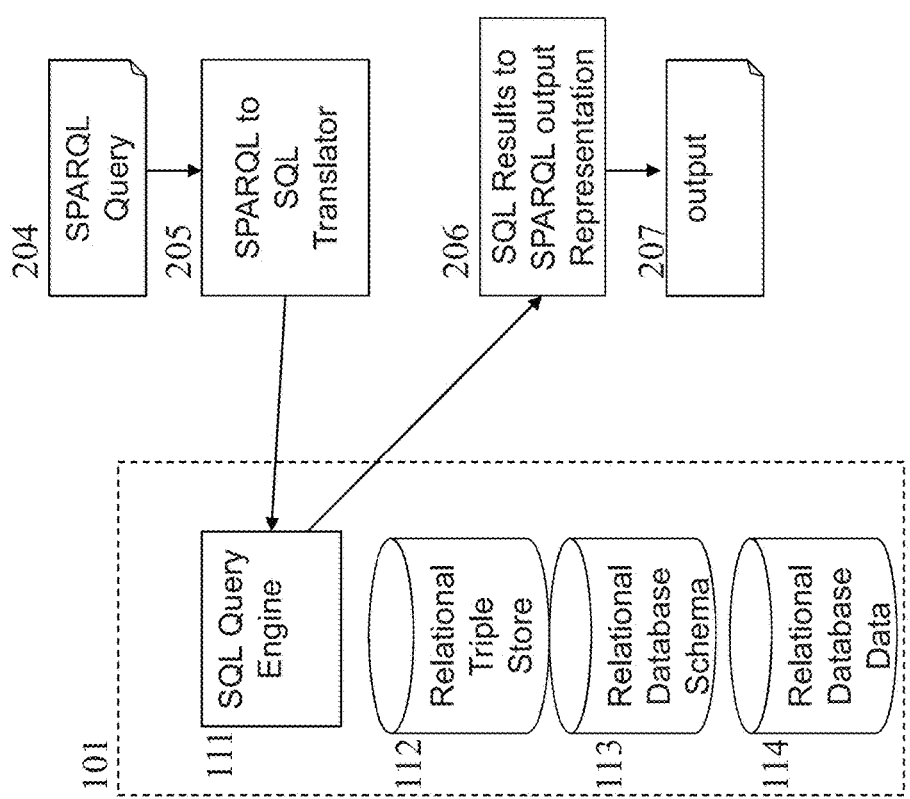
FIG. 2: Diagram of alternate organization for more general output formatting
Figure 3:
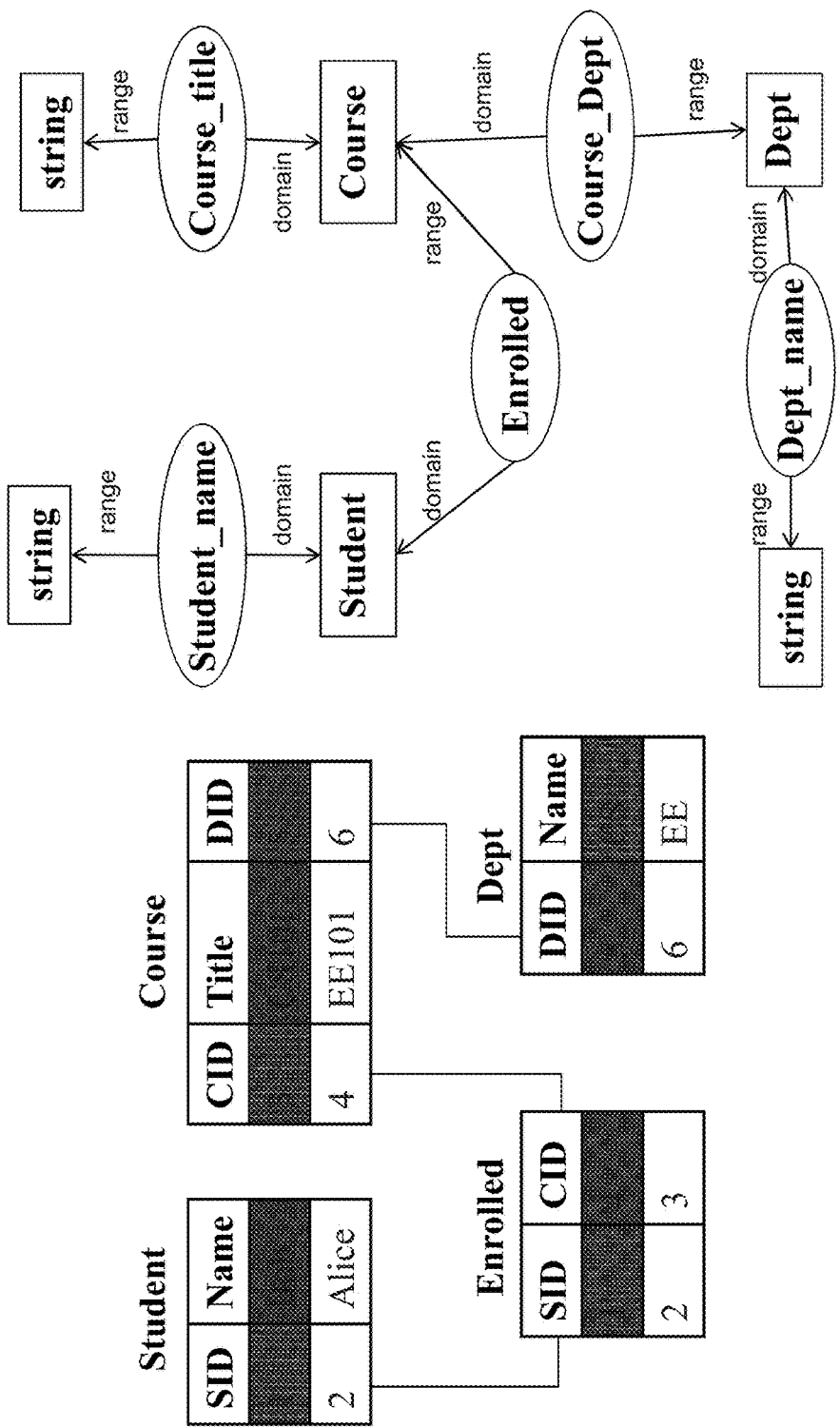
FIG. 3: An example relational schema and its synthesized domain model
Figure 4:
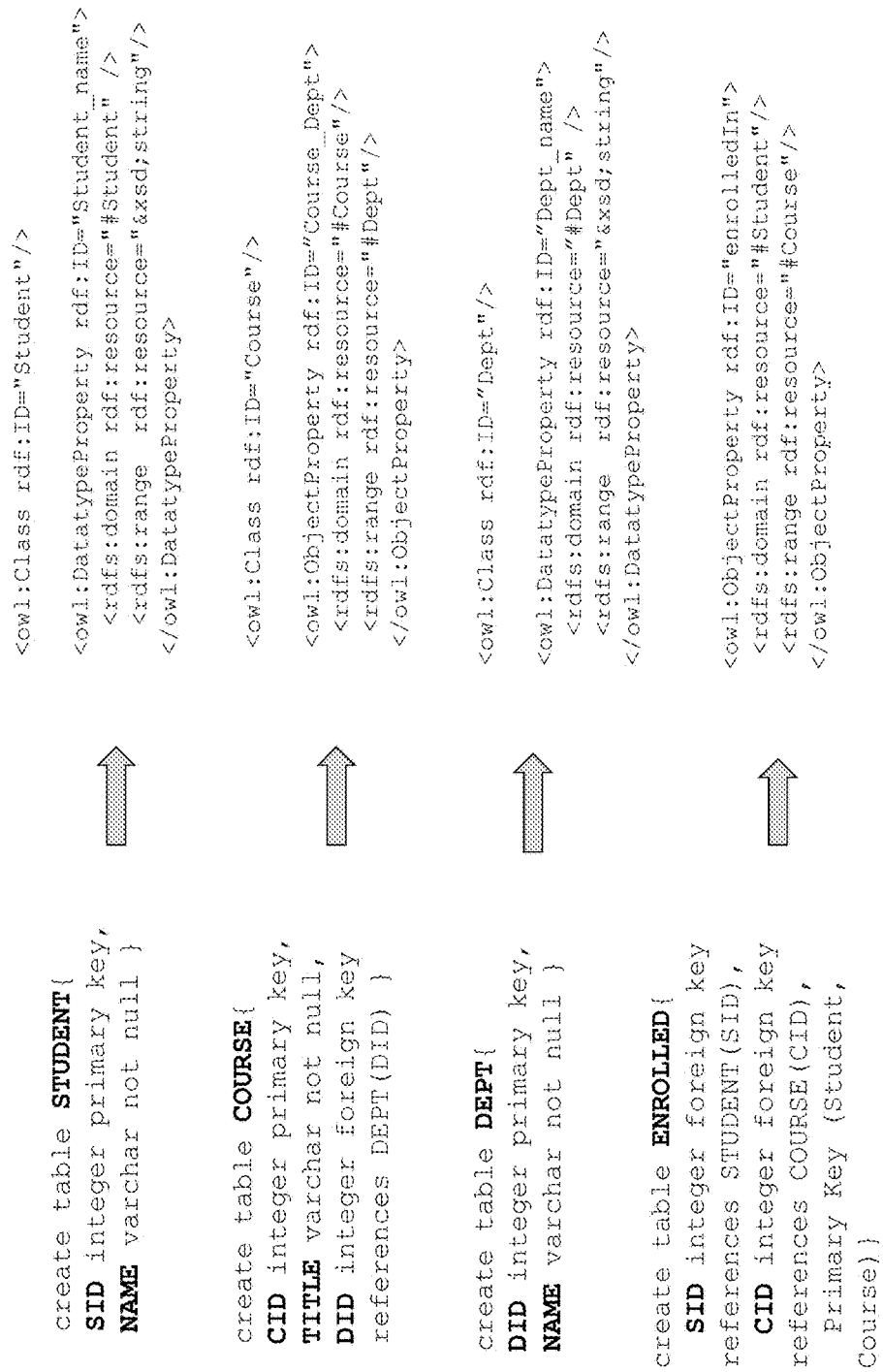
FIG. 4: An example relational schema in SQL-DDL and its synthesized domain model in OWL using RDF/XML syntax
Figure 5:
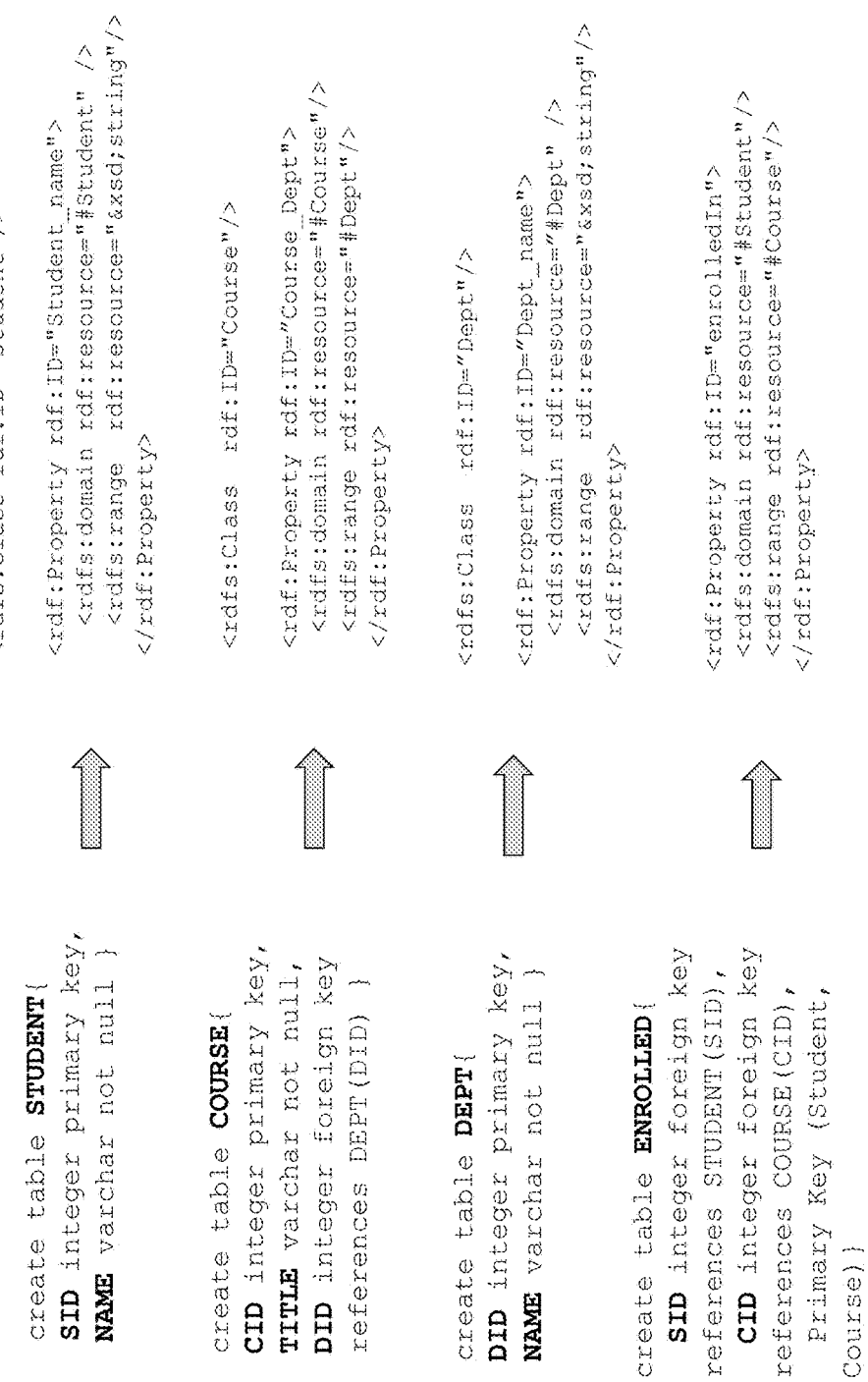
FIG. 5: An example relational schema in SQL-DDL and its synthesized domain model in RDFS using RDF/XML syntax

The component 103 algorithmically transforms the relational databases SQL schema, possibly including constraints, to an equivalent representation in one or more Semantic Web languages, including, but not limited to RDF, RDFS, OWL or RIF. The result is called the synthesized domain model. FIG. 3 contains a figurative example of such a translation. FIGS. 4 and 5 show examples of SQL schema definition statements and corresponding representation as OWL and RDFS, respectively. For detailed translation rules see "Translating SQL Applications to the Semantic Web", by Syed H. Tirmizi, Juan F. Sequeda, and Daniel P. Miranker, Proceedings of the 19th International Databases and Expert Systems Application Conference (DEXA2008), Turin, Italy. 2008, incorporated herein by reference.

FIG. 6 details a process to create a relational representation of the relational database as RDF triples in a single relation. FIG. 7 illustrates an example relational database and the RDF triples resulting from the process. The query may be embedded in a SQL CREATE VIEW statement, thus creating a logical definition of the relational database as RDF.

In particular, the create view can be materialized instead of being maintained as a run-time rule. Alternatively, the query generated by the algorithm in FIG. 6 may be used to query the database. The results may be stored in the local database, in another relational database or in a conventional triple-store such as Virtuoso or Jena, or some other RDF database management system. The embodiment detailed in FIG. 6 casts all data into a string data type. In another embodiment, the process may produce a number of tables, one for each SQL data type.

Figure 9:
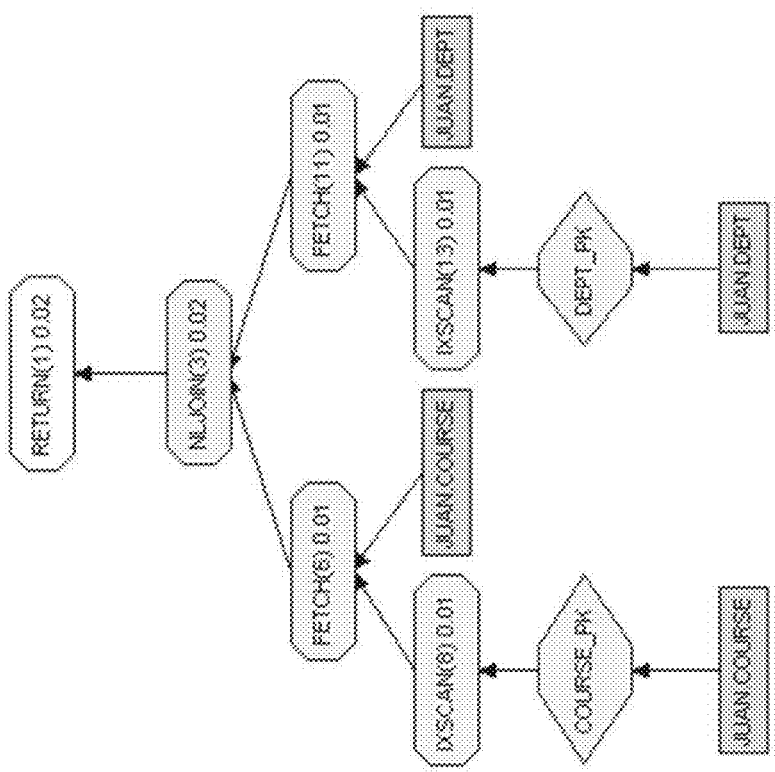
FIG. 9: Example DB2 query plan for query in FIG. 8
Figure 11:
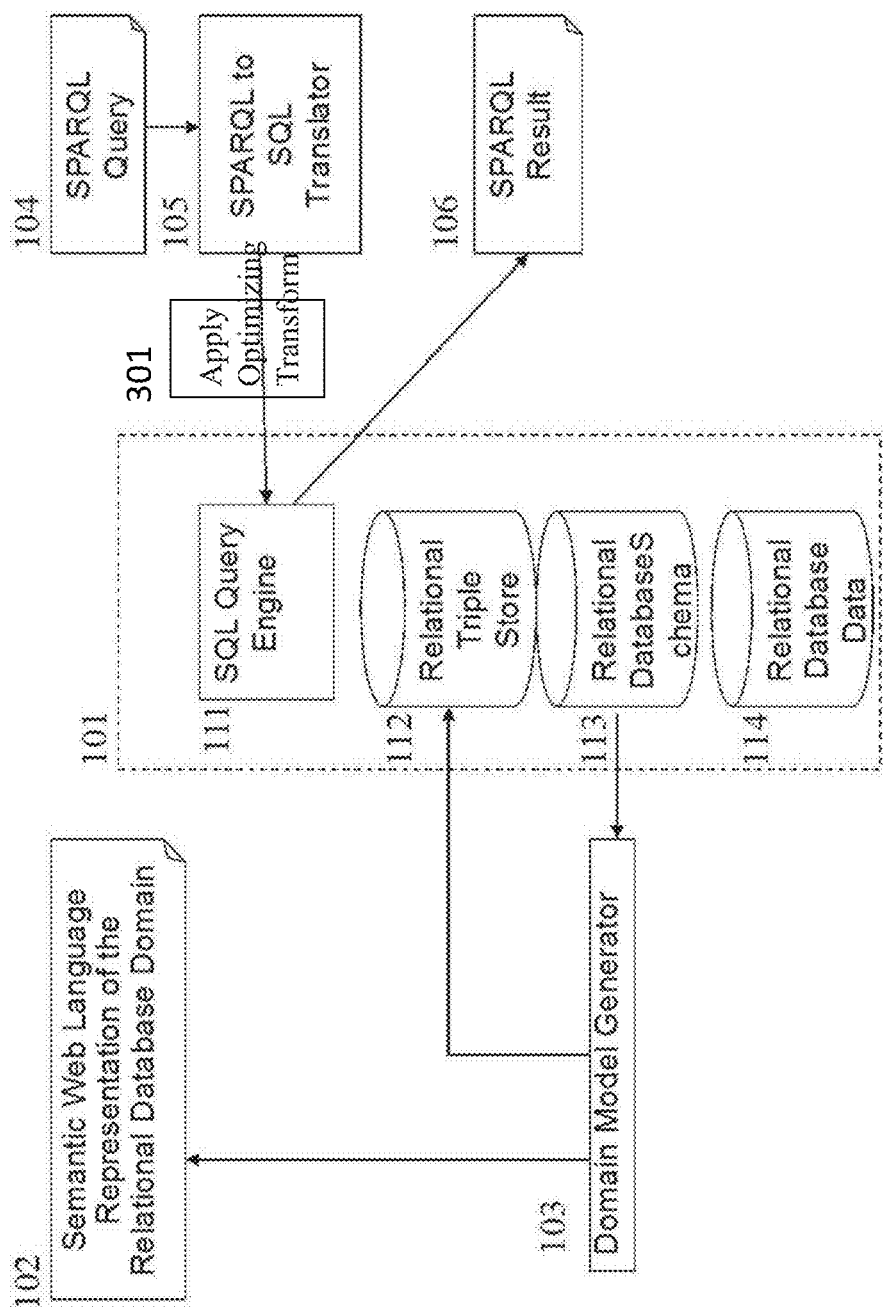
FIG. 11: Components of the Invention including optimization transform.

The SPARQL to SQL translator, 105 205, substitutes SPARQL strings for SQL strings. For substitutions see, "The Expressive Power of SPARQL." Proceedings of the 7th International Semantic Web Conference (2008) R. Angles, C. Guituerrez and See "SPARQL Query Language for RDF". W3C Recommendation. January 2008, by Eric Prud'hommeaux and Andy Seaborne both of which are incorporated herein by reference. An example of the substitution is illustrated in FIG. 8. The resulting SQL query is executed by the SQL engine. FIG. 9 shows the query plan produced by IBM's DB2 relational database system for the query in FIG. 8.

Prior art approaches for management of the semantic web are either based on RDBMS or are native database management systems for triples. Jena, Oracle, Sesame and 3store are some examples of triple stores that use RDBMS. These approaches center on a single triple table and a look up table. Others consider a property table approach. The previous approaches mentioned are focused on storing Semantic Web data. The prior art does not address what happens in the frequent situation where legacy relational database data needs to be exposed in the Semantic Web. The problem can be recast as: how can RDF and Linked Data be created from legacy relational data. There are two options: have a static dump of the data in RDF or dynamically generate RDF and being able to query a relational database with SPARQL. Relational data can be transformed into RDF through existing ETL methods. However these static approaches have a drawback when it comes to consistency with the relational data. Furthermore, it is not possible to query the relational data with SPARQL through these methods.

Dynamic approaches map the relational database schema with existing ontologies and vocabularies used on the Semantic Web. When a SPARQL query is issued, the mapping between the relational schema and ontology allows the query to be translated into a SQL query that is executed over the relational database. The prior art include manually creating mappings between the two regimes. A manually created mapping between the ontology and the relational schema with the SQL language and not a view of triples is difficult and not efficient and automatic.

In the preferred embodiment, the invention is a compiled system. During initialization the database is examined by querying the data catalog. Relational representations are compiled to Semantic Web representations. Reading the catalog and creating views commonly requires administrative permissions, which must be enabled. At runtime, SPARQL queries are naively translated to SQL.

These four components are divided into an initialization and query evaluation phase. The initialization phase is composed of the first two components. By deriving automatically the ontology, the relational data can be represented in triples. The creation of the intentional triples eliminates the problem of consistency between a triple store and the relational database by never creating a physical copy of the triples. The last two components are part of the query evaluation phase. SPARQL queries are naively translated to SQL queries that operate on the triples. The query engine automatically performs to implement the intricate rewrites from a triple-based evaluation to a relational evaluation.

To create the OWL description of the legacy database the invention maps one schema to the other. In one embodiment, the mapping of Tirmizi et. al. is used. Whether the results of a purely syntax driven translation of a SQL schema to OWL will result in an OWL file with all the properties necessary for an axiom system to be an ontology is controversial. Thus, we call the resulting OWL an example of a putative ontology (PO). A putative ontology would be any syntactic transformation of a data source schema to an ontology. Tirmizi et al's mapping includes translations for all SQL table and constraints, including enumerations. Further the system includes mappings for each association created by every possible combination of primary and foreign keys.

The first data description language (DDL) specified in the first SQL standard offered little more expressive power beyond that of relational algebra. Clearly legacy databases dating back to that first SQL standard will have few, if any, explicit, application domain detail. The OWL ontology generated from that representation will have dubious value as an ontology. However the current SQL standard includes a rich constraint system. Modern data modeling efforts provide for the inclusion of application-based constraints.

Figure 17:
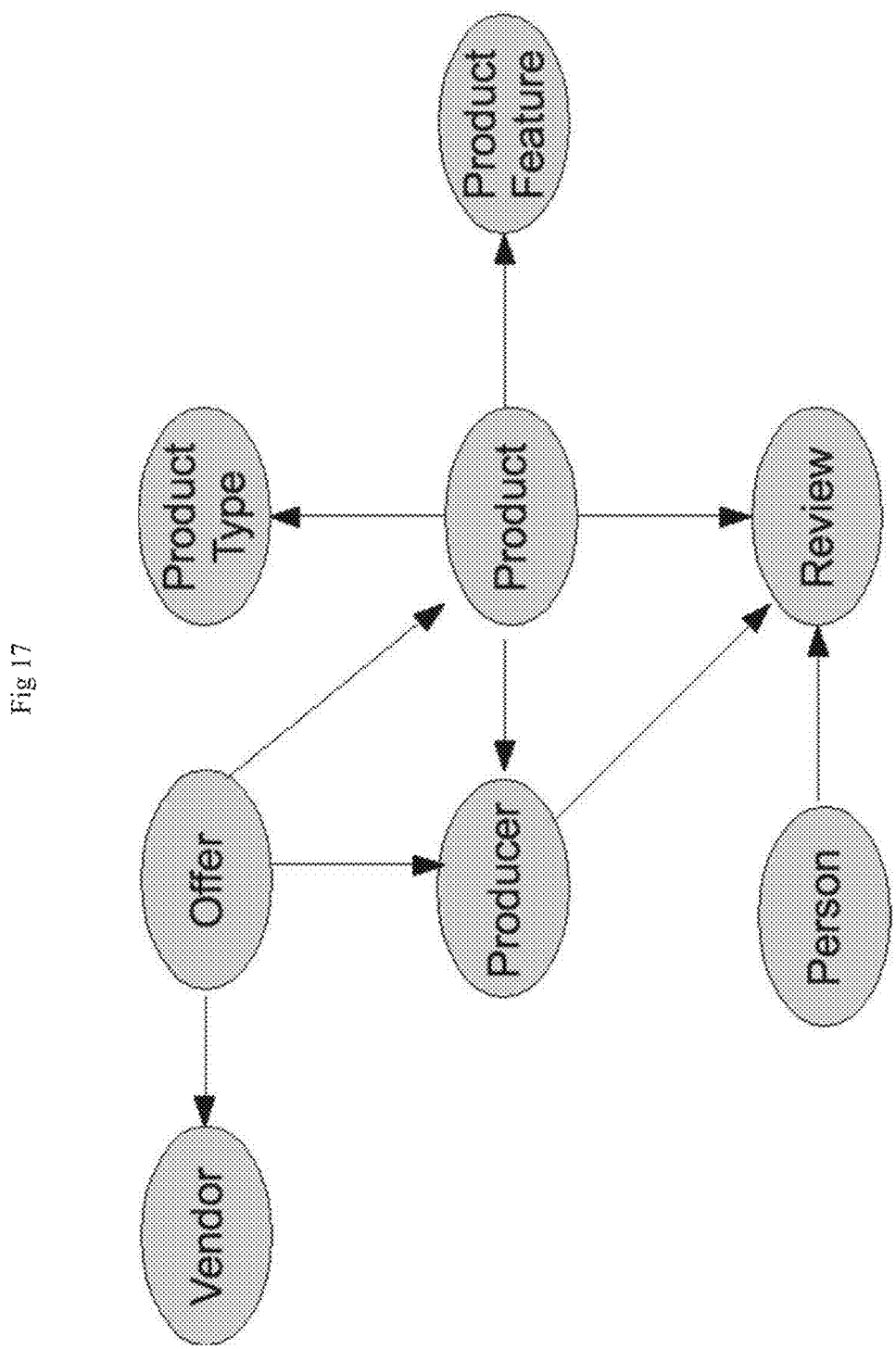
FIG. 17. Resulting transform to an OWL Putautive Ontology.
Figure 18:
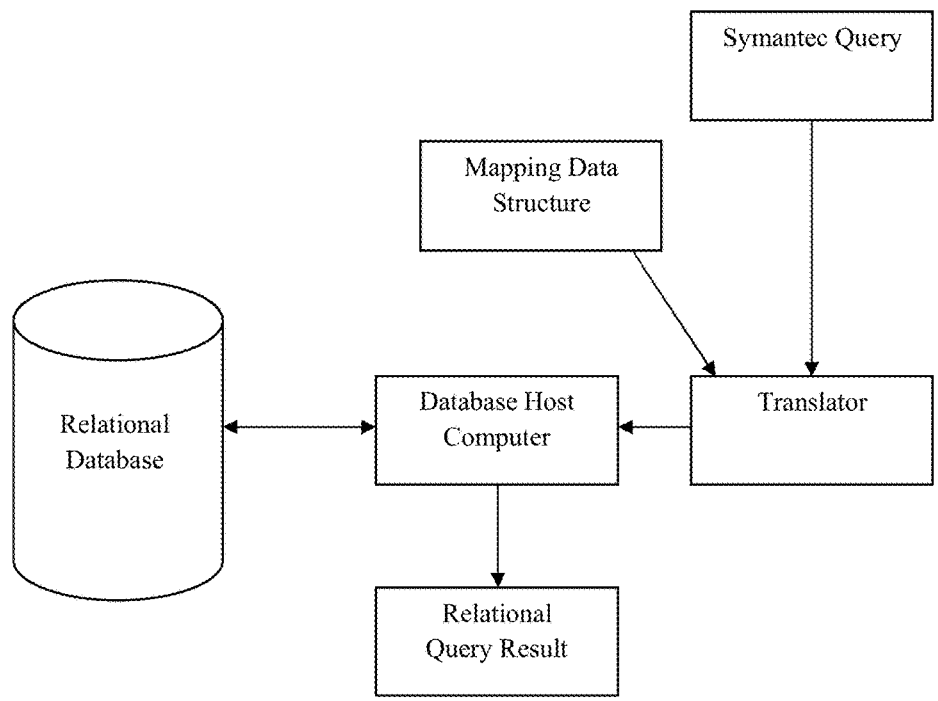
FIG. 18. Example system embodiment.

In another embodiment, the first step is to generate a putative ontology based on the SQL-DDL of the input schema. In one embodiment, the BSBM schema (FIG. 15) is used as the input. The result of transforming the relational schema to an OWL PO following the rules of Tirmizi et al. is shown in FIG. 17.

Relational Database as RDF Triples

The invention utilizes a synthetic domain model, (also referred to as putative ontology or "PO"), as the basis for a user to develop SPARQL queries. As ontology matching systems are integrated into the Semantic Web to provide seamless webs of linked data, we anticipate that for many systems synthetic domain models, or putative ontologies will be sufficient for the purpose. Consequently, the details of the triple or RDF representation of the database contents must be consistent with the synthetic domain model.

In one embodiment, the definition of the triple representation is intentionally presented as a SQL view. This view consists of the union of all the queries that define all the triples based on the PO. In other words, the view logically defines a three column view (subject, predicate and object), containing one row per triple.

Figure 15:
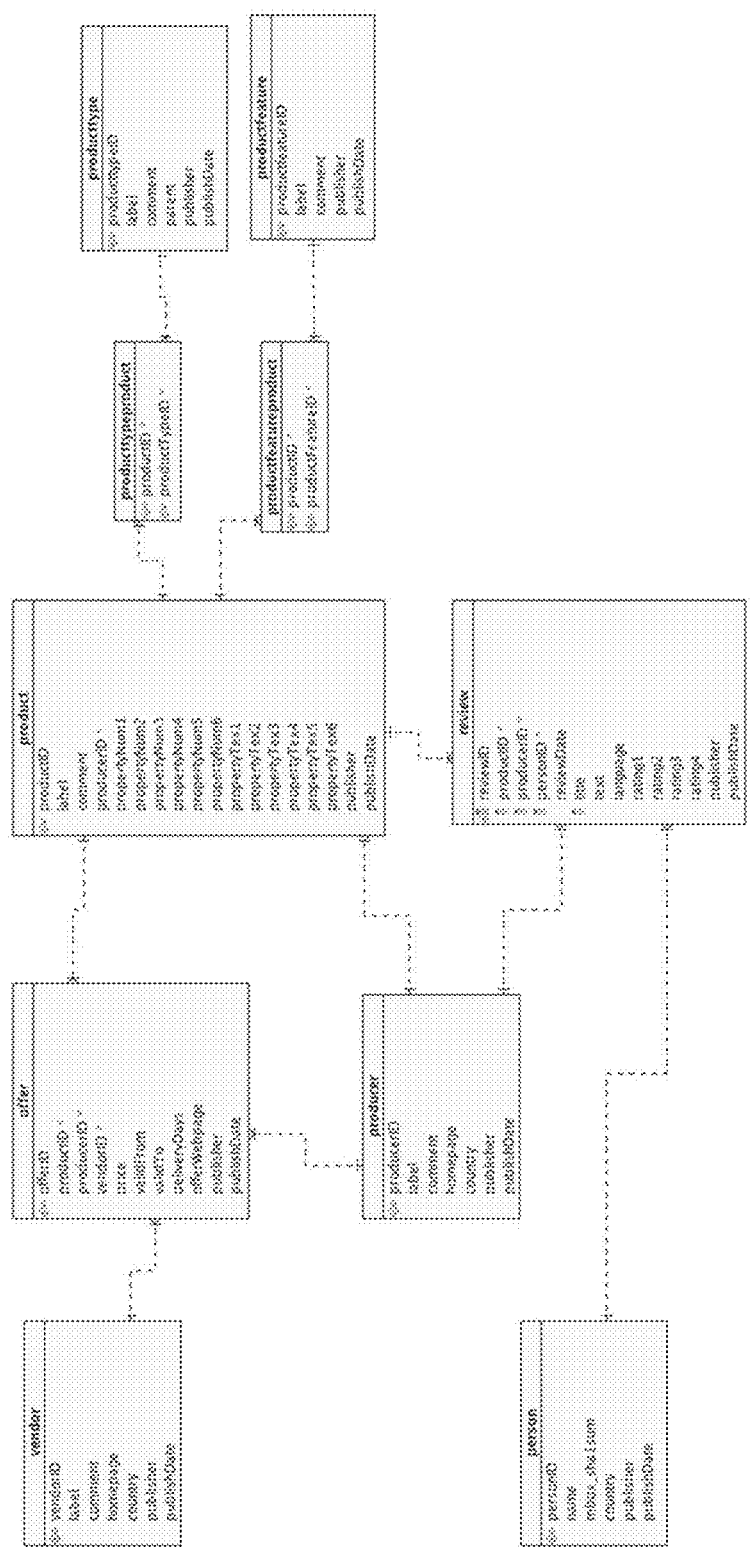
FIG. 15. Example BSBM relational schema.
Figure 16:
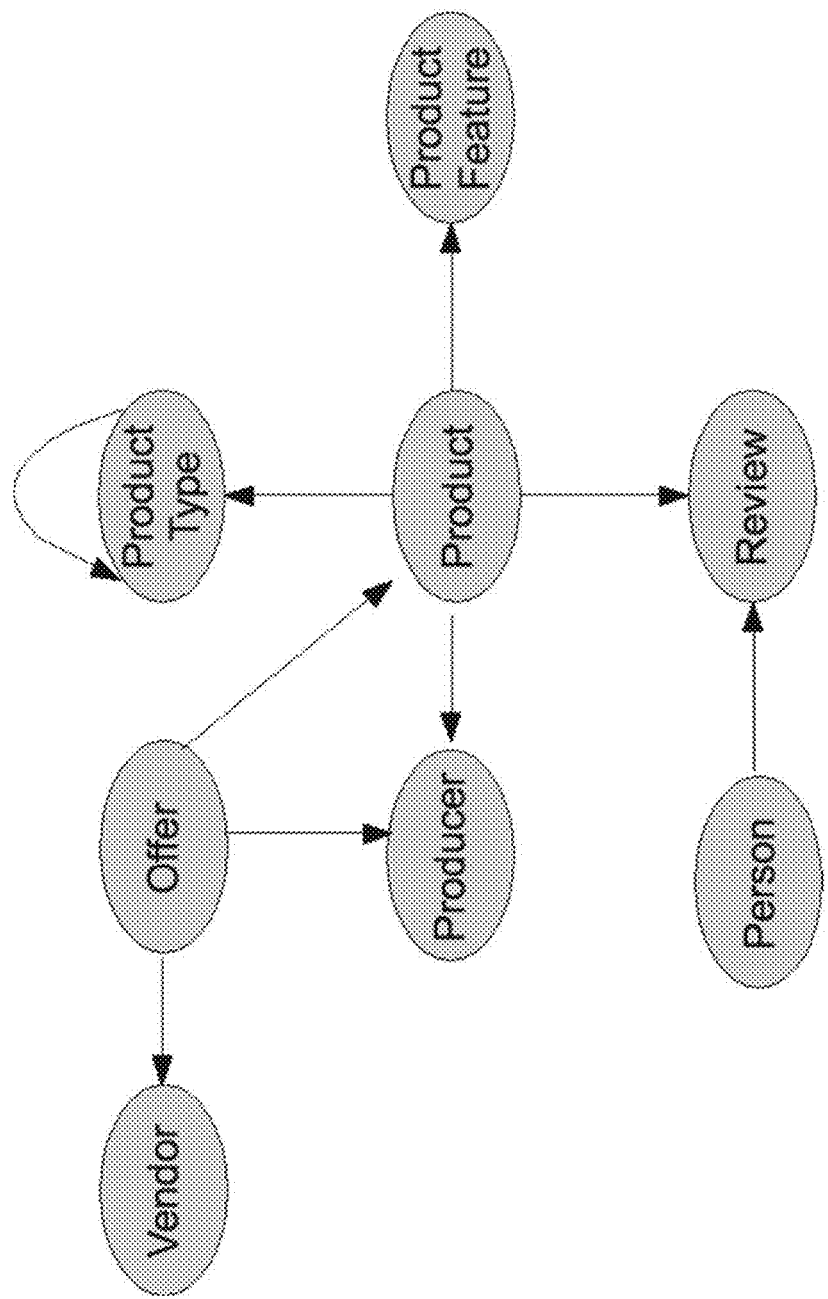
FIG. 16. Resulting transform to an OWL Putautive Ontology.

For example, consider the table Product from the relational schema (See FIG. 15). The invention translates the table Product into the ontological concept Product. Afterwards, SQL queries need to be generated that defines the triple statements for each translation. For example, it is necessary to define in triple statements that there is a Product that has a label "ABC", a numerical property of 1 and 2. An example of this query is shown in Table 1. Finally, the union of all these queries defines the final triple view, as shown in Table 2.

TABLE 1

Example of Product relation from the relational schema.

| Id | Label | propNum1 | propNum1 |
|----|-------|----------|----------|
| 1  | ABC   | 1        | 2        |
| 2  | XYZ   | 3        | 3        |

SELECT "Product" +Product.id as s, "rdf: type" as p "Product" as o FROM Product
SELECT "Product" +Product.id as s, "product#label" as p "ABC" as o FROM Product. (1)

TABLE 2

SQL Triple View of the Product relation from BSBM schema

| S | P | O |
|---|---|---|
| Product 1 | rdf: type | Product |
| Product 1 | label | ABC |

TABLE 2-continued

SQL Triple View of the Product relation from BSBM schema

| S | P | O |
|---|---|---|
| Product 1 | propNum1 | 1 |
| Product 1 | propNum2 | 2 |

In this example, we only take in account the generation of owl:Class, owl:ObjectProperty and owl:DatatypeProperty. Therefore given the PO, the relational data can be mapped to a SQL view with the following process:

```
For a Database D
    CREATE VIEW TripleView(s,p,o) AS UNION [U]
    for each x
        if(x instanceOf Class)
            insert 'SELECT x.name+x.primarykey, 'rdf:type', x.name
            FROM x.name' into U
        if(x instanceOf Datatype Property)
            insert 'SELECT x.domain+x.primaryKey, 'ns:x.name', x.name
            FROM x.domain'
into U
        if(x instanceOF Object Property)
            insert 'SELECT x.domain+x.primaryKey, 'x.name',
            x.range+x.primaryKey FROM
x.name' into U
```

Most triple stores implemented as triple tables do not store strings in the triple table. Instead, they store keys or hash values in the triple. These keys are then mapped to a look up table, like a dictionary. However, this invention creates a view over the strings. The objective is to assure real-time consistency between the relational and RDF presentation of the data. Therefore, if the relational data is updated, the RDF should be consistent in real-time. Another embodiment is to implement the triple and dictionary table like other approaches. This may be costly to maintain the dictionary table consistent in real-time with the relation data. Furthermore, current triple stores in the art typically hash values because they are storing URIs. In another embodiment of the invention, URI's are not stored, therefore the size of the strings are much smaller. For that reason, it is valuable to create a view over the strings.

The query evaluation phase is the second stage of the invention's methods. This phase gets executed when a SPARQL query is issued. The first part is to translate the SPARQL query to an equivalent SQL query that gets executed over the SQL view. The final step is in which the SQL query optimizer, rewrites the triple based SQL query to a SQL query that executes on the extensional relational data.

SPARQL to SQL

The SPARQL to SQL component of the invention naively translates a SPARQL query to a SQL query that is issued to operate on TripleView as the FROM. For example, the SPARQL query in (2) is translated to the SQL query in (3).

SELECT ?product ?label
WHERE {
?product label ?label.
?product propNum1 1.
?product propNum2 2.}. (2)
SELECT t1.s as product, t1.o as label FROM tripleview t1, t2, t3
WHERE and t1.p='label' and t2.s=t1.s and t2.p='propNum1' and t3.s=t1.s and t3.p='propNum2'. (3)

In another embodiment, the query optimizer of the database engine is used to rewrite the query to the native SQL query on the relational schema. Consider a datalog syntax to represent the TripleView in Table 2 from the relation table in Table 1.

Triple(1, label, ABC):-Product(1, ABC, _, _)
Triple(1, propNum1, 1):-Product(1,_, 1,_)
Triple(1, propNum1, 2):-Product(1,_,_,2). (4)

Now consider the query in (2). In a datalog syntax, this would be represented:

Answer(X, Y):-Triple(X, label, Y),
Triple(X, propNum1, 1),
Triple(X, propNum2, 2)
(5)

The native SQL query on the relational table would be:
SELECT id, label FROM product WHERE propNum1=1 and propNum2=2
(6)

In datalog syntax, this query would be represented:
Answer(X, Y):-Product(X, Y, 1, 2) (7)

Now if the SPARQL query (2) is substitute with the definition of the view (4), we have the following:
Answer(X, Y):-Product(X,Y, 1, _), Product(X,Y,_,2)
(8)

Finally, by unifying both predicates, we get the same result as (7), which is the same native SQL query on the relation schema.

The SQL schema of a relational database can be automatically translated into an OWL putative ontology or synthetic domain model, by applying transformation rules. Finally, due to its syntactic transformation, the putative ontology takes the terminology derived from the SQL DDL.

Given the SQL query to operate over the tripleView, the SQL optimizer is able to generate a query plan that will rewrite the query that is to be executed on the relational data. Consider the relational table shown in Table 1. Generating the triples from this relational table would yield the triple table shown in Table 2. Now consider the SPARQL query shown above at (2). The SQL query on the relational table would be:

SELECT label FROM product WHERE propNum1=1 and propNum2=2 (9)

Without any index support, the SQL query on the relational table would execute in O(n), where n is the number of rows. However, in the case of a triple table, for each triple pattern in the SPARQL query, there needs to be a self-join. For native triple stores that are represented in triple tables, there is not a way to avoid the self-join, because the query optimizer is only aware of one table: the triple table. Hence, in triple-tables, the self-joins are not compiled out. The triple version of a relational table will contain c*n rows where c is the number of columns and n is the number of rows. Therefore, the worst case complexity when executing a SPARQL query on a triple table is O(nc), where c is the amount of columns that are being queried. Nevertheless, the invention can avoid the O(nc) complexity and bring it down to linear O(n). The SPARQL query gets translated into a SQL query that is posed on the tripleView. However, this tripleView is not alone, like in the case of triple stores implemented as triple-tables. The invention has the advantage that the relational schema exists, and the query optimizer generates queries that are executed on the relational schema. The advantage of the query optimizer generating queries is that it would be compiling out the self joins.

Simple URI substitution:

The concept of globally unique identifiers is fundamental to OWL ontologies and that these take the form of URIs is required by RDF standard specification. Per the standard, a URI acts as a web-wide unique key for a string or concept.

Each class or property in the ontology must have a unique identifier, or URI. While it is possible to use the names from the relational schema to label the concepts in the ontology, it is necessary to resolve any duplications, either by producing URIs based on fully qualified names of schema elements, or by producing them randomly. In addition for human readability, RDFS labels should be produced for each ontology element containing names of corresponding relational schema elements. In one embodiment the transformation rules combine with a set of URI creation rules. Further, the URI creation rules may integrate a dictionary of fixed strings. In one embodiment the fixed strings may be specified by a user and, for example, comprise the domain name of the database server. In another embodiment a user may use a GUI (graphical user interface) or a process may methodically examine each string derived from the database schema, determine its uniqueness and/or replace it from a list of unique strings defined a priori. In yet another embodiment, these methods may be combined by applying each one and concatenating the results.

For example, the SPARQL query and the corresponding SQL query in FIG. 8 are presented using human friendly strings. In one embodiment the domain model generator 103 may place strings and concatenation operators to create URIs in the tripleView and the SQL query engine itself will produce the correct SPARQL RDF result 106. FIG. 10(a) illustrates a fragment of a SQL create view command where the embodiment relies on SQL post-processing 206 to form URIs. FIG. 10(b) illustrates a fragment of a SQL create view command embodying the SQL query engine implements the creation of the required RDF, URI syntax.

Another embodiment of SQL post-processing 206 to form URIs, may be used. Most triple stores implemented as triple tables do not store strings in the triple table. Instead, they store keys or hash values in the triple. These keys are then mapped to a look up table, like a dictionary. In this other embodiment, the dictionary of replacement strings that is defined concomitant with the synthesized domain model, is used by the post-processor to emit the correct URI. In a further extension of this embodiment, if the user is not satisfied with the judgment to fill in the gap between the domain semantics captured, it is still possible to add missing semantics using techniques based on other wrapper-based approaches.

Optimizations:

Upon succeeding in wrapping a database and reviewing query plans, two relational database optimizations are important for effective execution of SPARQL queries: (1) detection of unsatisfiable conditions and (2) self-join elimination. These two optimizations are among semantic query optimization (SQO) methods known in the art. In SQO, the objective is to leverage the semantics, represented in integrity constraints, for query optimization. The basic idea is to use integrity constraints to rewrite a query into a semantically equivalent one and eliminate contradictions.

Figure 12:
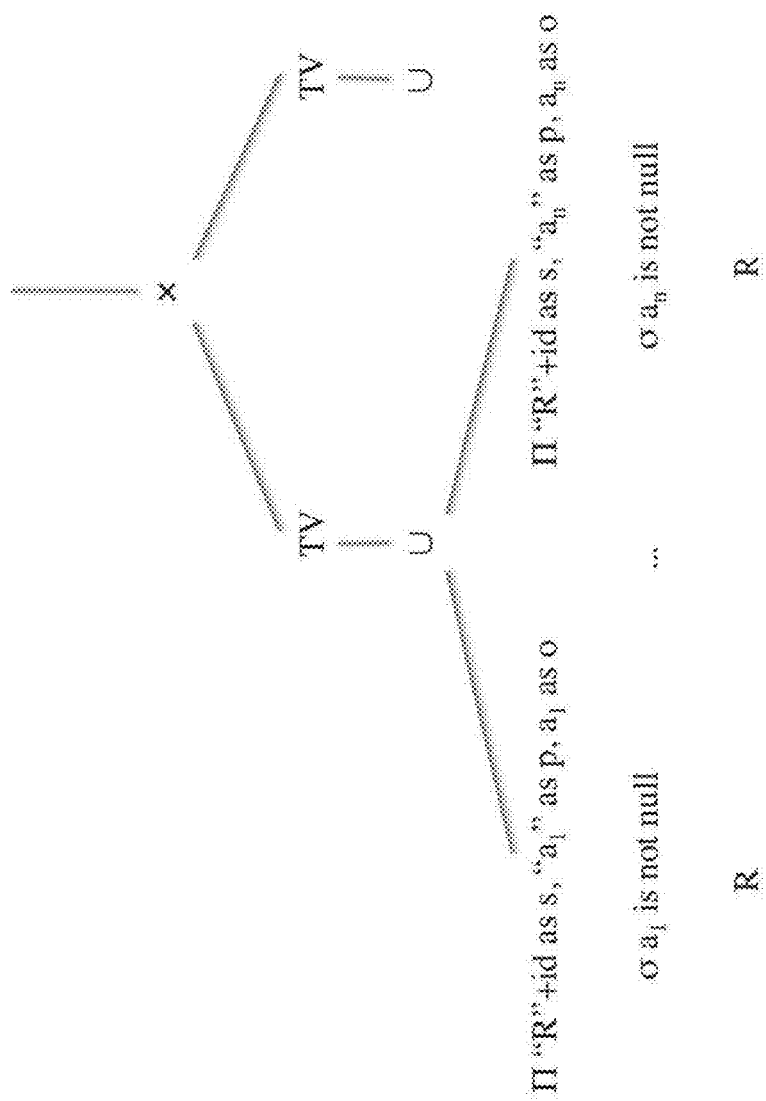
FIG. 12. Initial logical query plan.

Consider the following SPARQL query:
SELECT ?label ?pnum1
WHERE{?x label ?label.
?x pnum1 ?pnum1.}
Which gets translated into the following SQL query on the TripleView:
SELECT t1.o AS label, t2.o AS pnum1
FROM tripleview_varchar t1, tripleview_int t2
WHERE t1.p='label' AND t2.p='pnum1' AND t1.spk=t2.spk FIG. 12 shows the logical query plan. In this query plan, for each of the triple patterns in the query, the TripleView is accessed which is consequently a union of all the SFW statements.

Detection of Unsatisfiable Conditions

The idea of this optimization is to determine that the query result will be empty if the existence of another answer would violate some integrity constraint in the database. This would imply that the answer to the query is null and therefore the database does not need to be accessed. The invention benefits from this optimization by two different transformations, which are referred to as elimination by contradiction and unnecessary union sub-tree pruning.

Elimination by Contradiction: In the inventions TripleView, the constant value of a SFW statement acts as the integrity constraint. Consider the following TripleView:
CREATE VIEW TripleView_varchar(s,spk,p,o,opk) AS
SELECT 'Person'+id as s, id as spk, 'name' as p, name as o, null as opk FROM Person WHERE name IS NOT NULL
UNION ALL
SELECT 'Produce'+id as s, id as spk, 'label' as p, label as o, null as opk FROM Product
WHERE label IS NOT NULL The first SFW statement has a constant predicate value name while the second SFW statement has a constant predicate value label. Now consider the following query "return all labels of Products":
SELECT o FROM TripleView_varchar WHERE p='label'

The first SFW statement defines p=name to every single query while the query contains p=label. With this contradiction, this particular SFW statement can be substituted by the empty set.

The transformation is as follows:
T and contradiction(T) □ { }

Unnecessary Union Sub-tree Pruning: Since the TripleView definitions include all possible columns, any specific SPARQL query will only need a small subset of the statements defined in the view. Once the elimination by contradiction transformation happens, all the unnecessary
UNION ALL conditions are removed. For example:
UNION ALL ({ }, T)=T
UNION ALL ({ }, S, T)=UNION ALL (S, T)

Figure 13:
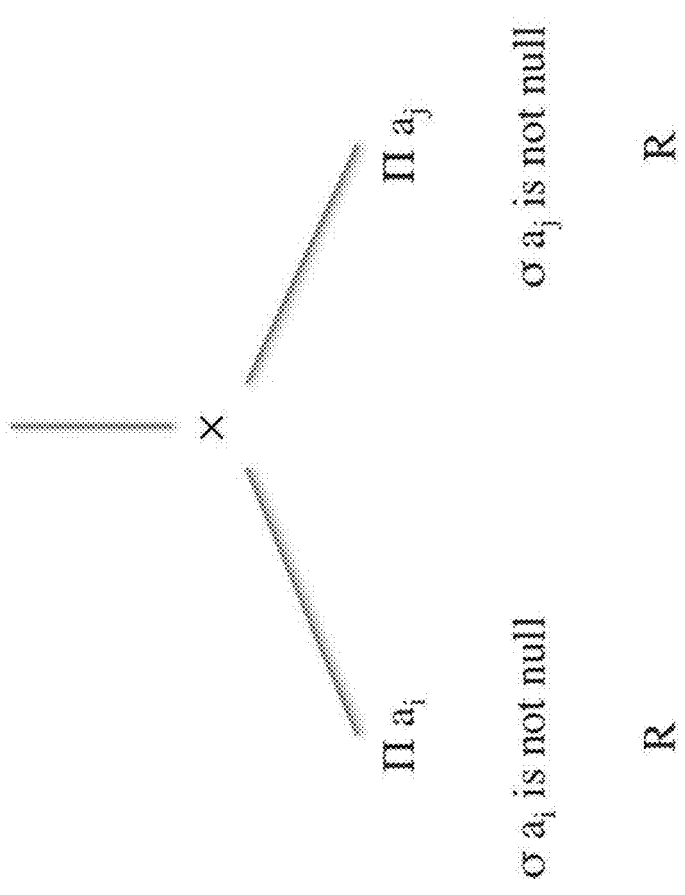
FIG. 13. Logical query plan after Detection of Unsatisfiable Conditions optimization.

When these two transformations are combined, the unreferenced portions of each view definition can reduce the TripleView to the specific subset of referenced columns in a manner that is very similar to standard On-Line Transaction Processing (OLTP) queries. These queries are well supported by existing commercial optimizers. With this optimization, the query plan in FIG. 12 is optimized from having the entire TripleView to just the exact SFW statements that are needed, as shown in FIG. 13.

Self-join Elimination

Join elimination is one of the several SQO techniques, where integrity constraints are used to eliminate a literal clause in the query. This implies that a join could also be eliminated if the table that is being dropped does not contribute any attributes in the results. The type of join elimination that is desired is the self-join elimination, where a join occurs between the same tables. There are two different cases: self-join elimination of attributes and self-join elimination of selections.

Self-join elimination of projection: This occurs when attributes from the same table are projected individually and then joined together. For example, the following un-optimized query projects the attributes label and pnum1 from the table product where id=1, however each attribute projection is done separately and then joined:

SELECT p1.label, p2.pnum1 FROM product p1, product p2 WHERE p1.id=1 and p1.id=p2.id Given a self-join elimination optimization, the previous query should be rewritten to:

SELECT label, pnum1 FROM product WHERE id=1

Self-join elimination of selection: This occurs when a selection on attributes from the same table are done individually and then joined together. For example, the following un-optimized query selects on pnum1>100 and pnum2<500 separately and then joined:

SELECT p1.id FROM product p1, product p2 WHERE p1.pnum1>100 and p2.pnum2<500 and p1.id=p2. id Given a self-join elimination optimization, the previous query should be rewritten to:

SELECT id FROM product WHERE pnum1>100 and pnum2<500

FIG. 14 shows the final query plan after the self-joins are removed.

Operating Environment:

The system is typically comprised of a central server that is connected by a data network to a user's computer. The central server may be comprised of one or more computers connected to one or more mass storage devices. The precise architecture of the central server does not limit the claimed invention. In addition, the data network may operate with several levels, such that the user's computer is connected through a fire wall to one server, which routes communications to another server that executes the disclosed methods. The precise details of the data network architecture does not limit the claimed invention. Further, the user's computer may be a laptop or desktop type of personal computer. It can also be a cell phone, smart phone or other handheld device. The precise form factor of the user's computer does not limit the claimed invention. In one embodiment, the user's computer is omitted, and instead a separate computing functionality provided that works with the central server. This may be housed in the central server or operatively connected to it. In this case, an operator can take a telephone call from a customer and input into the computing system the customer's data in accordance with the disclosed method. Further, the user may receive from and transmit data to the central server by means of the Internet, whereby the user accesses an account using an Internet web-browser and browser displays an interactive web page operatively connected to the central server. The central server transmits and receives data in response to data and commands transmitted from the browser in response to the customer's actuation of the browser user interface. Some steps of the invention may be performed on the user's computer and interim results transmitted to a server. These interim results may be processed at the server and final results passed back to the user.

The invention may also be entirely executed on one or more servers. A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the web site can be by means of an Internet browser accessing a secure or public page or by means of a client program running on a local computer that is connected over a computer network to the server. A data message and data upload or download can be delivered over the Internet using typical protocols, including TCP/IP, HTTP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The method described herein can be executed on a computer system, generally comprised of a central processing unit (CPU) that is operatively connected to a memory device, data input and output circuitry (TO) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the IO circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory. The IO devices can include a display screen, loudspeakers, microphone and a movable mouse that indicate to the computer the relative location of a cursor position on the display and one or more buttons that can be actuated to indicate a command.

Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like. The computer can operate a program that receives from a remote server a data file that is passed to a program that interprets the data in the data file and commands the display device to present particular text, images, video, audio and other objects. The program can detect the relative location of the cursor when the mouse button is actuated, and interpret a command to be executed based on location on the indicated relative location on the display when the button was pressed. The data file may be an HTML document, the program a web-browser program and the command a hyper-link that causes the browser to request a new HTML document from another remote data network address location.

The Internet is a computer network that permits customers operating a personal computer to interact with computer servers located remotely and to view content that is delivered from the servers to the personal computer as data files over the network. In one kind of protocol, the servers present webpages that are rendered on the customer's personal computer using a local program known as a browser. The browser receives one or more data files from the server that are displayed on the customer's personal computer screen. The browser seeks those data files from a specific address, which is represented by an alphanumeric string called a Universal Resource Locator (URL). However, the webpage may contain components that are downloaded from a variety of URL's or IP addresses. A website is a collection of related URL's, typically all sharing the same root address or under the control of some entity.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer. In one embodiment, the relational database may be housed in one or more operatively connected servers operatively connected to computer memory, for example, disk drives. The invention may be executed on another computer that is presenting a user a semantic web representation of available data. That second computer can execute the invention by communicating with the set of servers that house the relational database. In yet another embodiment, the initialization of the relational database may be prepared on the set of servers and the interaction with the user's computer occur at a different place in the overall process.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the Appendices is intended only to provide an extremely detailed disclosure of the present invention and is not intended to be limiting.

The foregoing description discloses only exemplary embodiments of the invention. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention as defined by the following claims.

The invention claimed is:

1. A system comprised of one or more computers for executing a digitally encoded first query that is expressed in a query language operable on a graph representation of data, on the data contents of a pre-existing relational database with comprised of a corresponding relational database schema, said system comprising:
   a computer memory comprised of stored data encoding the first query, said stored first query being expressed in a query language operable on a graph representation of data;
   a translating module comprised of logic configured to automatically translate the stored first query into a second digitally encoded database query expressed in a relational query language by using a mapping data structure stored in a computer memory comprising said system, said data structure embodying a graph that represents a synthetic domain model representation of the relational database schema, in order to create a data object representing the second translated relational query; and
   a relational database system comprised of the pre-existing relational database configured by logic to execute the second translated relational query on the pre-existing relational database.

2. The system of claim 1 further comprising an optimizing a module comprised of logic configured to optimize the second translated query prior to its execution on the relational database.

3. The system of claim 2 where the optimizing module is further configured to detect an at least one unsatisfiable condition.

4. The system of claim 2 where the optimizing module is further configured to execute a self-join elimination.

5. The system of claim 2 where the optimizing module is further configured to execute a self outer join elimination.

6. The system of claim 1 where the translating module is further configured to use a data structure representing the synthetic domain model expressed in OWL (Web Ontology Language).

7. The system of claim 1 where the translating module is further configured to use a data structure representing the synthetic domain model expressed in RDFS (Resource Description Framework Schema).

8. The system of claim 1 further comprising a generating module adapted by logic to generate from the representation of the synthetic domain model a data structure embodying an RDF (Resource Description Framework) logical representation of the pre-existing relational database data that conforms to the synthetic domain model.

9. The system of claim 1 further comprising a generating module adapted by logic to generate a data structure representing an RDF (Resource Description Framework) logical representation using a view definition associated with the pre-existing relational database.

10. The system of claim 9 where the view definition is a SQL view definition.

11. The system of claim 9 where the view definition is logical.

12. The system of claim 9 where the view definition is materialized.

13. The system of claim 10 where the SQL view definition is comprised of a body nested in the translated query.

14. The system of claim 1 where the translating module is further configured to output data representing the second translated relational query where the arguments of the second translated relational query are at least one column of a RDF (Resource Description Framework) logical representation of at least a portion of the data contents of the pre-existing relational database.

15. The system of claim 1 where the translating module is further configured to convert a unique resource identifier into a string comprised of a combination of a table name identifying a data table and a column label associated with the data table identified by the table name.

16. The system of claim 1 where the translating module is further configured to materialize into a data structure a plurality of database records comprising the pre-existing relational database as an RDF (Resource Description Framework) representation.

17. The system of claim 1 where the translating module is further configured to determine component substitutions of an at least one component comprising the stored first query.

18. The system of claim 1 further comprising a second translating module comprised of logic configured to translate the output of the relational database executing the second translated relational query into a data output that conforms to the query language operable on a graph representation of data.

19. The system of claim 1 where the graph representation of data is a property graph.

20. The system of claim 1 where the first query is expressed in a query language operable on a semantic graph representation of data.

21. The system of claim 1 where the first query is expressed in a query language operable on a property graph representation of data.

22. The system of claim 1 where the first query is expressed in a query language operable on a RDF representation of data.

23. The system of claim 1 where the first query is expressed in a query language operable on a triple table representation of data.

24. The system of claim 23 where the triple table has more than three columns.

25. A method executed by a computer system comprised of one or more computers, for executing a digitally encoded first query that is expressed in a query language operable on a graph representation of data, on the data contents of a pre-existing relational database comprised of a corresponding relational database schema, said method comprising:
   retrieving from a data storage device data encoding the first query, said first query being expressed in a query language operable on a graph representation of data
   automatically translating the first database query into a second digitally encoded translated database query expressed in a relational query language by using a mapping data structure stored in a computer memory comprising said computer system, said data structure embodying a graph that represents a synthetic domain model representation of the relational database schema in order to create a data object representing the second translated relational query; and
   executing the second translated relational query on the pre-existing relational database.

26. The method of claim 25 further comprising the step of: optimizing the second translated query prior to its execution on the pre-existing relational database.

27. The method of claim 26 further comprising the step of: detecting an at least one unsatisfiable condition.

28. The method of claim 26 further comprising the step of: executing a self-join elimination.

29. The method of claim 26 further comprising the step of: executing a self outer join elimination.

30. The method of claim 25 further comprising the step of: generating a data structure representing the synthetic domain model expressed in OWL (Web Ontology Language).

31. The method of claim 25 further comprising the step of: generating a data structure representing the synthetic domain model expressed in RDFS (Resource Description Framework Schema).

32. The method of claim 25 further comprising the step of: generating a data structure embodying an RDF (Resource Description Framework) logical representation of the pre-existing relational database data that conforms to the synthetic domain model.

33. The system of claim 25 further comprising the step of: generating a data structure representing an RDF (Resource Description Framework) logical representation of a portion of the pre-existing relational database using a view definition associated with the pre-existing relational database.

34. The method of claim 22 where the view definition is a SQL view definition.

35. The method of claim 33 where the view definition is logical.

36. The method of claim 33 where the view definition is materialized.

37. The method of claim 34 where the SQL view definition is comprised of a body nested in the translated query.

38. The method of claim 25 further comprising the step of: generating data representing the second translated relational query where the arguments of the second translated query are at least one column of a RDF (Resource Description Framework) logical representation of at least a portion of the data contents of the pre-existing relational database.

39. The method of claim 25 further comprising the step of: converting a unique resource identifier into a string comprised of a combination of a table name identifying a data table and a column label associated with the data table identified by the table name, said data table being a component of the pre-existing relational database.

40. The method of claim 25 further comprising the step of: materializing in a data structure a plurality of database records comprising the pre-existing relational database as an RDF (Resource Description Framework) representation.

41. The method of claim 25 further comprising the step of: determining the component substitutions of an at least one component comprising the retrieved first query.

42. The method of claim 25 further comprising the step of: translating the output of the relational database executing the second translated relational query into a data output that conforms to the query language operable on a graph representation of data.

43. The method of claim 25 where the graph representation of data is a property graph.

44. The method of claim 25 where the first query is expressed in a query language operable on a semantic graph representation of data.

45. The method of claim 25 where the first query is expressed in a query language operable on a property graph representation of data.

46. The method of claim 25 where the first query is expressed in a query language operable on a RDF representation of data.

47. The method of claim 25 where the first query is expressed in a query language operable on a triple table representation of data.

48. The method of claim 47 where the triple table has more than three columns.

\* \* \* \* \*